US 8,626,153 B2

(12) United States Patent
Vaittinen et al.

(10) Patent No.: US 8,626,153 B2
(45) Date of Patent: Jan. 7, 2014

(54) METHOD, APPARATUS AND COMPUTER PROGRAM FOR TERMINATING MOBILE STATION RECEIPT OF MULTIMEDIA BROADCAST/MULTIMEDIA SERVICE (MBMS) SERVICE BEARER

(75) Inventors: Rami Vaittinen, Singapore (SG); Antero Lundell, Turku (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 949 days.

(21) Appl. No.: 11/397,539

(22) Filed: Apr. 4, 2006

(65) Prior Publication Data
US 2006/0221896 A1    Oct. 5, 2006

Related U.S. Application Data

(60) Provisional application No. 60/668,293, filed on Apr. 4, 2005.

(51) Int. Cl.
*H04W 4/00*    (2009.01)

(52) U.S. Cl.
USPC ........... 455/430; 455/436; 455/428; 455/438; 455/437; 370/328; 370/352; 370/331

(58) Field of Classification Search
USPC ......... 370/328, 432, 493, 312, 390, 336, 322; 455/414.3, 432.3, 509, 515, 511, 466, 455/517, 503, 445; 714/748
See application file for complete search history.

(56) References Cited

U.S. PATENT DOCUMENTS

| | | | | |
|---|---|---|---|---|
| 6,714,784 | B1* | 3/2004 | Forssell et al. | 455/436 |
| 2001/0040883 | A1* | 11/2001 | Chang et al. | 370/344 |
| 2004/0008657 | A1* | 1/2004 | Lee et al. | 370/342 |
| 2004/0085926 | A1* | 5/2004 | Hwang et al. | 370/328 |
| 2004/0136344 | A1* | 7/2004 | Kim et al. | 370/335 |
| 2004/0184426 | A1* | 9/2004 | Tan | 370/338 |
| 2004/0185837 | A1* | 9/2004 | Kim et al. | 455/414.3 |

(Continued)

FOREIGN PATENT DOCUMENTS

| | | |
|---|---|---|
| EP | 1045559 A1 | 10/2000 |
| EP | 1098541 A1 * | 5/2001 |
| WO | WO-2004/071117 | 8/2004 |

OTHER PUBLICATIONS

3GPP TR 23.846, version 6.1.0 (Dec. 2002), Multimedia Broadcast/Multicast Service (MBMS) Architecture and functional description, Chapter 7.1.5.

(Continued)

*Primary Examiner* — Mahendra Patel

(57) ABSTRACT

In one non-limiting aspect thereof the exemplary embodiments of this invention provide a method, a computer program product and a mobile station operable in accordance therewith to originate a request at the mobile station to terminate reception of a Multimedia Broadcast/Multimedia Service radio bearer; and to transmit the request to a wireless network that is the source of the Multimedia Broadcast/Multimedia Service radio bearer. In another non-limiting aspect thereof the exemplary embodiments of this invention provide a method, a computer program product and a wireless network node operable in accordance therewith to receive a request from a mobile station to terminate reception of a Multimedia Broadcast/Multimedia Service radio bearer and, in response, to send the mobile station a PACKET TBF RELEASE message that includes an identification of the mobile station and a TBF_RELEASE_CAUSE value defined as Stop Receiving MBMS Radio Bearer.

24 Claims, 3 Drawing Sheets

(56) References Cited

U.S. PATENT DOCUMENTS

| | | | |
|---|---|---|---|
| 2005/0047359 A1* | 3/2005 | Sebire | 370/312 |
| 2005/0141538 A1* | 6/2005 | Beckmann et al. | 370/432 |
| 2005/0174956 A1* | 8/2005 | Yi et al. | 370/312 |
| 2006/0106865 A1* | 5/2006 | Beming et al. | 707/104.1 |
| 2006/0140411 A1* | 6/2006 | Zhu | 380/277 |
| 2007/0265012 A1* | 11/2007 | Sorbara et al. | 455/446 |

OTHER PUBLICATIONS

3GPP TS 43.246, version 6.2.0 (Jan. 2005), GSM/EDGE Radio Access Network; Multimedia Broadcast Multicast Service (MBMS) in the GERAN, Chapter 6.2.2.2 and 6.1.3.

3GPP TS 44.060, version 6.11.1, Release 6, subclause 5.5.1.5, Discontinuous reception (DRX) pp. 37-38, Feb. 2005.

3GPP TS 44.060, version 6.11.1, Release 6, subclause 8.1.4.4, "Radio Link Control/Medium Access Control (RLC/MAC)" p. 100, Feb. 2005.

3GPP TS 44.060, version 6.11.1, Release 6, subclause 11.2.26 "Packet TBF Release" pp. 277-278, Feb. 2005.

3GPP TS 23.246 version 6.4.0, Release 6, "Multimedia Broadcast/Multicast Service (MBMS)" in its entirety, Feb. 2005.

3GPP TR 23.846 6.1.0 (Dec. 2002), Technical Specification Group Services and System Aspects; Multimedia Broadcast/Multicast Service (MBMS); Architecture and functional description (Release 6), pp. 1-114.

3rd Generation Partnership Project; Technical Specification Group Services and System Aspects; Multimedia Broadcast/Multicast Service; Stage 1 (Release 6); 3GPP TS 22.146 V6.6.0 (Sep. 2004), source document indicates last modified on Oct. 1, 2004, 17 pages.

* cited by examiner

METHOD, APPARATUS AND COMPUTER PROGRAM FOR TERMINATING MOBILE STATION RECEIPT OF MULTIMEDIA BROADCAST/MULTIMEDIA SERVICE (MBMS) SERVICE BEARER

CLAIM OF PRIORITY FROM COPENDING PROVISIONAL PATENT APPLICATION

This patent application claims priority under 35 U.S.C. §119(e) from Provisional Patent Application No. 60/668,293, filed Apr. 4, 2005, the disclosure of which is incorporated by reference herein in its entirety.

TECHNICAL FIELD

The examples of this invention relate generally to digital wireless communications systems and devices and, more specifically, relate to mobile station (MS) operation in a Multimedia Broadcast/Multimedia Service (MBMS) mode of operation.

BACKGROUND

MBMS is a unidirectional Point-to-Multipoint (P-t-M) multicast/broadcast service in which data is transmitted from a single source entity to a group of users in a specific area. MBMS may comprise a selection of unidirectional point-to-multipoint and bi-directional point-to-point transmissions of multimedia data (e.g. text, audio, picture, video) from a single source entity to a multiplicity of users in a service area. As used herein a Service Area for a given MBMS service is understood to be a geographical area (i.e., set of cells) where the service is made available. The goal of MBMS is therefore to allow the provision of multiple instances of a point-to-point (P-t-P) service with a single transmission over the radio interface as a radio multicast.

Reference with regard to MBMS can be made to a document: 3GPP TS 23.246, V.6.4.0 (2004-09) "Multimedia Broadcast/Multicast Service (MBMS); Architecture and Functional Description" (Release 6), incorporated by reference herein in its entirety. The MBMS has two modes of operation: Broadcast mode and Multicast mode. One significant difference between the two modes is that in Broadcast mode all MBMS users in the service area are targeted, whereas in Multicast mode it is possible to address only a subset of the MBMS users in the service area. Typically, before receiving the service the multicast mode requires the user to subscribe to a multicast group.

The reception of a MBMS multicast service is enabled by certain procedures which are illustrated in FIG. 1, which duplicates FIG. 2 in sub-clause 4.4.1, "Multicast Mode", of the above-referenced 3GPP TS 23.246, V.6.4.0 (2004-09) document.

An example for the phases of MBMS broadcast service provision is illustrated in FIG. 2, which duplicates FIG. 4 in sub-clause 4.4.3, "Broadcast Mode", of the above-referenced 3GPP TS 23.246, V.6.4.0 (2004-09) document.

A description is now provided of a conventional release of MBMS resources and a leaving or termination procedure. As is stated in sub-clause 8.1.4.4 of 3GPP TS 44.060, "Radio Link Control/Medium Access Control (RLC/MAC) protocol; Stage 3", incorporated by reference herein in its entirety, only the network can initiate the release of a MBMS radio bearer. More specifically, it is stated that the "network may initiate the normal or abnormal release of an MBMS radio bearer by transmitting a PACKET TBF RELEASE message to the mobile station(s) on the PACCH" (Packet Associated Control Channel). The TBF is a Temporary Block Flow. In the same sub-clause is stated that the MS shall always stay in broadcast/multicast receive mode when it is receiving any MBMS bearer(s). More specifically, it is stated that: "If the mobile station in broadcast/multicast receive mode is not receiving any other MBMS radio bearers, it shall enter packet idle mode and apply the DRX mode procedures as specified in sub-clause 5.5.1.5, otherwise it shall remain in broadcast/multicast receive mode."

This requirement must be followed whether the user wishes to receive or to not receive any MBMS service(s). In the case that the user does not wish to receive any MBMS service(s), the MS still receives a MBMS service in the downlink, and may even be required to send feedback in the uplink if commanded by the network.

According to the above-referenced 3GPP TS 23.246, V.6.4.0 (2004-09) document, with a "leaving" procedure a subscriber leaves (i.e., stops being a member of) a multicast group, i.e., the user no longer wishes to receive Multicast mode data of a specific MBMS bearer service. One may consider the leaving procedure to represent a solution, from the perspective of the MS, to stop receiving the MBMS bearer service. However, the conventional leaving procedure is not suitable for MBMS service/sessions(s) that are repeated frequently, since its use results in a considerable amount of signaling in both the radio access and core networks.

According to normal General Packet Radio Service (GPRS) behavior in a mobile-originated release when a downlink TBF has been allocated, the MS simply leaves the channel, such as in a cell re-selection case. However, this type of behavior is not acceptable for use with MBMS since, for example, the MS may be in a feedback mode of operation where the network is expecting to receive an uplink transmission from the MS.

In view of the situation just described several undesirable results can occur, such as unnecessary MS battery consumption, increased signaling load in the network, and a decreased subscriber service satisfaction.

SUMMARY OF THE EXEMPLARY EMBODIMENTS OF THIS INVENTION

The foregoing and other problems are overcome, and other advantages are realized, in accordance with the exemplary embodiments of this invention.

In one non-limiting aspect thereof the exemplary embodiments of this invention provide a method that includes originating a request at a mobile station to terminate reception of a Multimedia Broadcast/Multimedia Service radio bearer; and transmitting the request to a wireless network that is the source of the Multimedia Broadcast/Multimedia Service radio bearer.

In another non-limiting aspect thereof the exemplary embodiments of this invention provide a computer program product that is embodied on a tangible memory media that is readable by a data processor of a mobile station. The computer program product comprises program instructions the execution of which result in performing operations that comprise originating a request at a mobile station to terminate reception of a Multimedia Broadcast/Multimedia Service radio bearer; and transmitting the request to a wireless network that is the source of the Multimedia Broadcast/Multimedia Service radio bearer.

In another non-limiting aspect thereof the exemplary embodiments of this invention provide a mobile station that includes a wireless transceiver for conducting bidirectional communications with a wireless network; a memory for storing a program; and a data processor coupled to the transceiver and to the memory. The data processor is operable to execute the program and, in response to execution of the program, originates a request to terminate reception of a Multimedia Broadcast/Multimedia Service radio bearer and to transmit the request to the wireless network that is the source of the Multimedia Broadcast/Multimedia Service radio bearer.

In a further non-limiting aspect thereof the exemplary embodiments of this invention provide a method that includes receiving a request from a mobile station to terminate reception of a Multimedia Broadcast/Multimedia Service radio bearer and, in response, sending the mobile station a PACKET TBF RELEASE message that comprises an identification of the mobile station and a TBF_RELEASE_CAUSE value defined as Stop Receiving MBMS Radio Bearer.

In a still further non-limiting aspect thereof the exemplary embodiments of this invention provide a computer program product embodied on a tangible memory media that is readable by a data processor of a wireless network node. The computer program product includes program instructions, the execution of which result in performing operations that comprise receiving a request from a mobile station to terminate reception of a Multimedia Broadcast/Multimedia Service radio bearer and, in response, sending the mobile station a PACKET TBF RELEASE message that comprises an identification of the mobile station and a TBF_RELEASE_CAUSE value defined as Stop Receiving MBMS Radio Bearer.

In one still further non-limiting aspect thereof the exemplary embodiments of this invention provide a wireless network node that includes a wireless transceiver for conducting bidirectional communications with a mobile station; a memory for storing a program and a data processor coupled to the transceiver and to the memory. The data processor is operable to execute the program and, in response to execution of the program, to receive a request from the mobile station to terminate reception of a Multimedia Broadcast/Multimedia Service radio bearer and in response, to send the mobile station a PACKET TBF RELEASE message that comprises an identification of the mobile station and a TBF_RELEASE_CAUSE value defined as Stop Receiving MBMS Radio Bearer.

In a further non-limiting aspect thereof the exemplary embodiments of this invention provide a method to operate a mobile station in a Multimedia Broadcast/Multimedia Service MBMS mode of operation. The method includes originating a request at the mobile station to terminate reception of a Multimedia Broadcast/Multimedia Service radio bearer and transmitting the request to a wireless network that is the source of the Multimedia Broadcast/Multimedia Service radio bearer. For a case that the mobile station is operating in a non-feedback mode of operation, originating and transmitting comprise sending the wireless network request message to request an uplink radio block, and the method further includes receiving from the wireless network an allocation of an uplink radio block; sending in the allocated uplink radio block a MBMS SERVICE REQUEST message to the wireless network, the MBMS SERVICE REQUEST comprising an identification of the mobile station and a Stop Receiving MBMS Radio Bearer parameter; and receiving from the wireless network a PACKET TBF RELEASE message that comprises the identification of the mobile station and a TBF_RELEASE_CAUSE value defined as Stop Receiving MBMS Radio Bearer. For a case that the mobile station is operating in a feedback mode of operation, originating and transmitting comprise sending the wireless network an identification of the mobile station and a Stop Receiving MBMS Radio Bearer parameter in a feedback-related message, and the method further includes receiving from the wireless network the PACKET TBF RELEASE message that comprises the identification of the mobile station and a TBF_RELEASE_CAUSE value defined as Stop Receiving MBMS Radio Bearer.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

Figure 1:
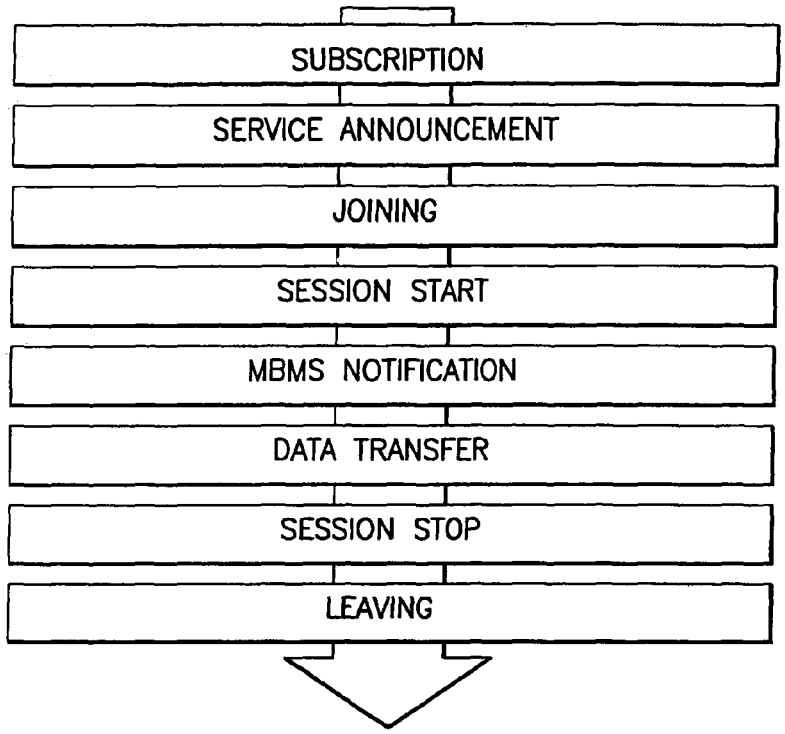
FIG. 1 illustrates various phases of MBMS Multicast Service provision.
Figure 2:
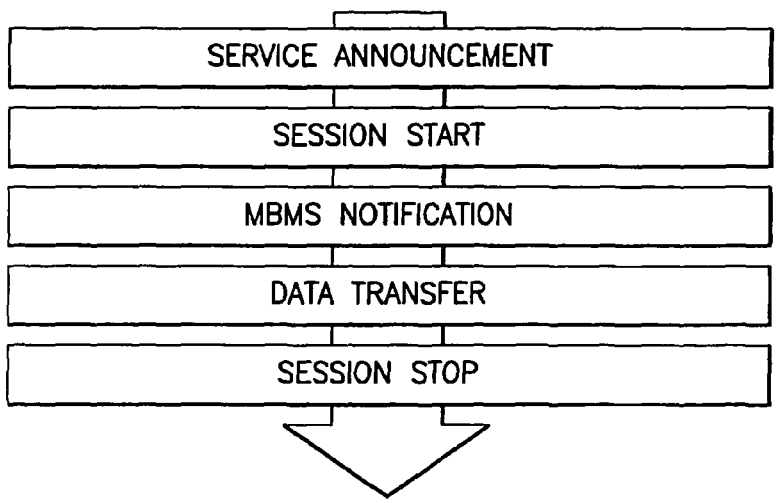
FIG. 2 illustrates various phases of MBMS Broadcast Service provision.

One non-limiting purpose of the exemplary embodiments is to address the problems discussed above, and to present a solution to the problems inherent in the MS stopping (terminating) the receiving of a MBMS service bearer. The exemplary embodiments of this invention can be employed to advantage during the MBMS notification and data transfer procedures, as generally outlined in FIGS. 1 and 2.

Figure 3:
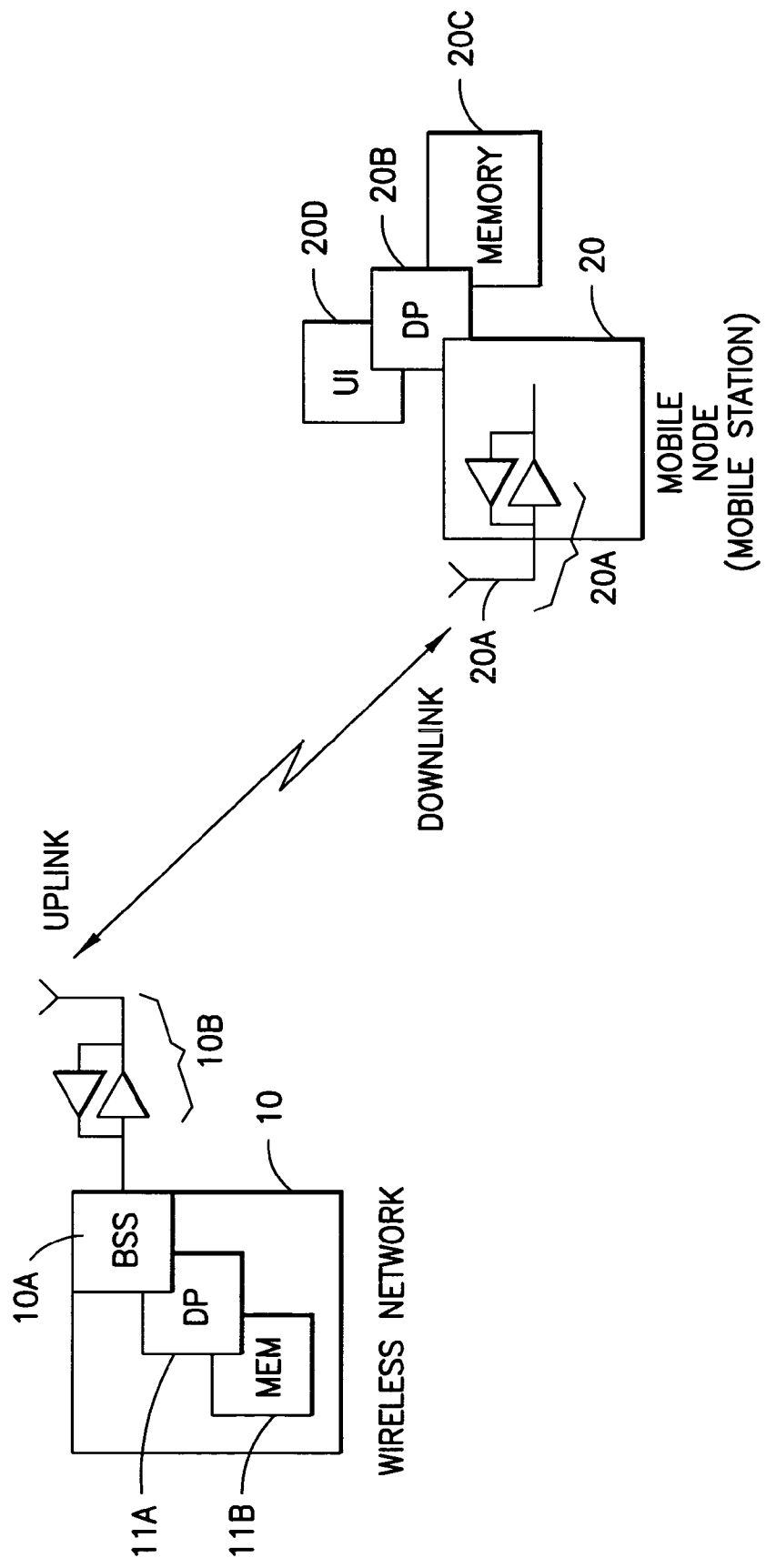
FIG. 3 is a block diagram shown a network node coupled to a mobile node, that is one suitable embodiment for practicing the exemplary embodiments of this invention.

Referring to FIG. 3, there is shown as a non-limiting example a wireless network 10 that includes a network node, such as a Base Station Subsystem (BSS) 10A, having at least one wireless (radio frequency RF) transceiver and antenna 10B for transmitting on the downlink (DL) to a mobile node, also referred to as a mobile station (MS) 20. The transceiver and antenna 10B also receives on the uplink (UL) a transmission from the MS 20. The network node (e.g., the BSS 10A) is assumed to include at least one data processor (DP) 11A coupled to a memory 11B, such a semiconductor memory. The memory 11B stores a computer program to operate the DP 11A in accordance with the exemplary embodiments of this invention, as discussed in further detail below. The MS 20 is assumed to include at least one suitable antenna and wireless transceiver 20A, as well as at least one data processor (DP) 20B coupled to a memory 20C, such a semiconductor memory. The memory 20C stores a computer program to operate the DP 20A in accordance with the exemplary embodiments of this invention, as described in further detail below. The MS 20 may also include a suitable user interface (UI) 20D, such as one having a visual display and a user entry means, such as a keypad, a keyboard and/or a touch sensitive display screen and/or voice activation. The network 10 is assumed to be capable of operation with the MS 20 in the MBMS mode discussed above.

In general, the various embodiments of the MS 20 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In general, the exemplary embodiments of this invention may be implemented by computer software executable by the DP 11A of the network node 10A, by the DP 20B of the MS 20, or by hardware, or by a combination of software, hardware and/or firmware. The memories 11B, 20C may be of any type suitable to the local technical environment and may be implemented using any suitable data storage technology, such as semiconductor-based memory devices, magnetic memory devices and systems, optical memory devices and systems, fixed memory and removable memory as non-limiting examples. The DP 11A and DP20B may be of any type suitable to the local technical environment, and may include one or more of general purpose computers, special purpose computers, microprocessors, digital signal processors (DSPs) and processors based on a multi-core processor architecture, as non-limiting examples.

In view of at least system simplicity considerations it would be reasonable to restrict the MS 20 originated stopping of the receipt of a MBMS service bearer only to the data transfer procedure, as the network 10 initiated release of a MBMS radio bearer is currently specified. From the UI 20D design point of view, however, it may not be possible to notify the user that a given session has been started until the MS 20 has correctly received a MBMS ASSIGNMENT message with a TMGI (Temporary Mobile Group Identity), a Session Id (when available), the MBMS_BEARER_ID and the P-t-M channel description parameters.

Another approach may specify an option in the UI 20D where the user sets his/her preference to receive an MBMS service so that stopping receipt of a MBMS bearer may be done automatically, and without user intervention during the notification procedure. With this approach the user has performed the joining procedure, but for some reason wishes not to receive an MBMS service. This behavior is especially beneficial in the MBMS broadcast mode, since by using it some often repeated advertisements or sessions can be avoided.

The exemplary embodiments of this invention may be employed to advantage to stop (terminate) receiving a MBMS service bearer, and to more specifically stop the receipt of a certain session of a given MBMS bearer. It should be noted that in the case of the MBMS bearer the leaving procedure may be preferred.

Described now is an example of a MS 20 originated stopping of the receipt of a MBMS service bearer via signaling, while in the notification or data transfer procedures.

Described first is the case where the MS 20 is not in the feedback mode.

Figure 4:
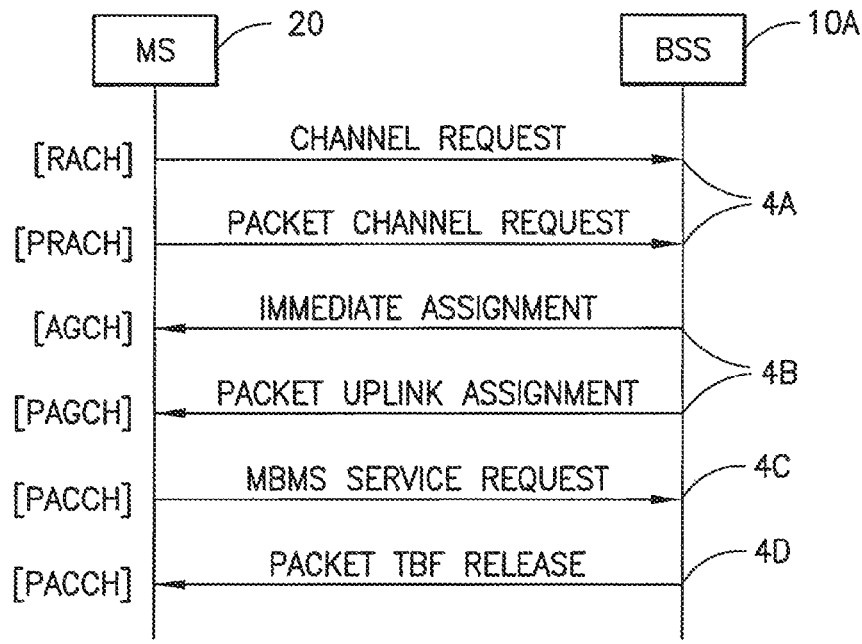
FIG. 4 is a message flow diagram that illustrates a MS-originated stop of reception of a MBMS radio bearer in accordance with the exemplary embodiments of this invention for a non-feedback mode of operation.

During the MBMS data transfer procedure, when the MS 20 is not in the feedback mode, upper layers of the MS 20 software may request to stop the receipt of a MBMS radio bearer. FIG. 4 depicts how the signaling can be performed in the MS 20 originated manner. In FIG. 4 the RACH is the Random Access Channel and the AGCH is the Access Grant Channel. The packet access to stop receiving the MBMS radio bearer is initiated by the MS 20 by sending a (PACKET) CHANNEL REQUEST message on (P)RACH or on the MPRACH, if allocated, with an access cause of "Single Block MBMS Access" for requesting a single uplink block (Step 4A).

Upon reception by the network 10 of a (PACKET) CHANNEL REQUEST message with the access cause "Single Block MBMS Access", the network 10 sends an IMMEDIATE ASSIGNMENT message on AGCH (or a PACKET UPLINK ASSIGNMENT message on a Packet Access Grant Channel (PAGCH)) for allocating one uplink block to the MS 20 (Step 4B).

Upon reception by the MS 20 of an IMMEDIATE ASSIGNMENT (respectively PACKET UPLINK ASSIGNMENT) message corresponding to one of its (PACKET) CHANNEL REQUEST messages that allocates one uplink radio block for MBMS access, the MS 20 sends in this radio block an MBMS SERVICE REQUEST message to the network 10 including its TLLI, the TMGI, Session Id of the session and, in accordance with examples of this invention, a Stop Receiving MBMS Radio Bearer parameter (Step 4C). In case the MBMS SERVICE REQUEST message is not correctly received on the network 10 side, the network 10 may repeat the IMMEDIATE ASSIGNMENT message on AGCH (or PACKET UPLINK ASSIGNMENT message on PAGCH), allowing the MS 20 to re-send the MBMS SERVICE REQUEST message.

Originally the MBMS SERVICE REQUEST message was specified for counting purposes, since its use allows the network 10 to estimate in a given cell the number of MSs 20 that are interested in a particular session. Thus, the newly defined Stop Receiving MBMS Radio Bearer parameter may be included within the MBMS SERVICE REQUEST message, although it could be included in another message as well.

Upon reception by the network 10 of the MBMS SERVICE REQUEST message that includes the Stop Receiving MBMS Radio Bearer parameter, the network 10 sends a PACKET TBF RELEASE message that contains a newly defined TBF_RELEASE_CAUSE value, and the TLLI parameter of the MS 20 (Step 4D). The TLLI is used to differentiate the requesting MS 20 from the other MSs also receiving the MBMS radio bearer. In its conventional use the PACKET TBF RELEASE message releases the entire MBMS radio bearer, and not just the TBF.

It is also within the scope of the examples of this invention to define a new message, or to use another currently existing message to acknowledge that the network 10 has received the Stop Receiving MBMS Radio Bearer indication from the MS 20.

A non-limiting example showing modifications to the PACKET TBF RELEASE message, in accordance with the exemplary embodiments of this invention, is depicted in further detail below.

Described now is the case where the MS 20 is in the feedback mode.

Figure 5:
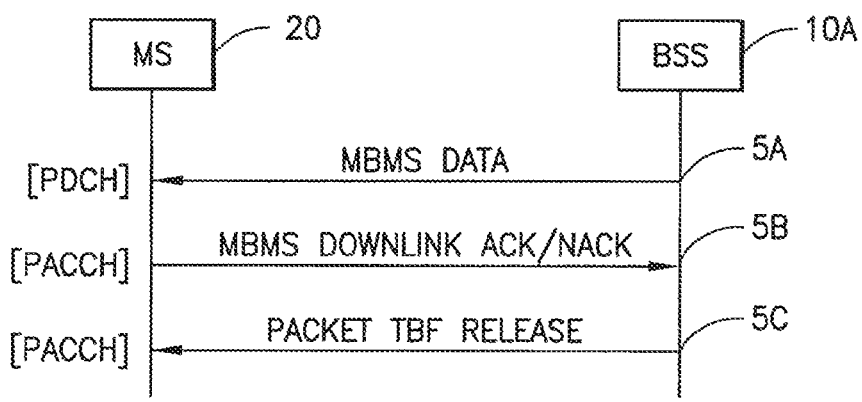
FIG. 5 is a message flow diagram that illustrates a MS-originated stop of reception of a MBMS radio bearer in accordance with the exemplary embodiments for a feedback mode of operation.

During a MBMS data transfer procedure, with the MS 20 in the feedback mode, the upper layers of the MS 20 may request to stop receiving an MBMS radio bearer. FIG. 5 depicts how the signaling can be accomplished in a MS-originated manner when block retransmission is used based on the MS 20 feedback.

During the MBMS session, when downlink MBMS data is sent on a Packet Data Channel (PDCH, at Step 5A), the MS_ID is used by the network 10 in order to address a specific MS 20 of the group of MSs, and is used by MS 20 on the uplink in order to allow the network 10 to identify the MS 20 among all of the MSs involved in the particular MBMS session. Each MS 20 addressed with a MS_ID may periodically be requested to send a MBMS DOWNLINK ACK/NACK message.

Further in accordance with the exemplary embodiments of this invention there is included a new Stop Receiving MBMS Radio Bearer parameter in the MBMS DOWNLINK ACK/NACK message sent by the MS 20 (Step 5B).

Upon reception by the network 10 of the MBMS DOWNLINK ACK/NACK message, the network sends PACKET TBF RELEASE message that contains a new TBF_RELEASE_CAUSE value, and the TLLI parameter of the MS 20 (Step 5C). The TLLI is used to differentiate the MS 20 from the group of the MSs receiving the MBMS radio bearer. Currently with the PACKET TBF RELEASE message it is only possible to release the entire MBMS radio bearer.

It is also within the scope of the exemplary embodiments of this invention to define a new message, or to use another currently existing message to acknowledge that the network 10 has received the Stop Receiving MBMS Radio Bearer indication from the MS 20.

A non-limiting example showing modifications to the PACKET TBF RELEASE message, in accordance the exemplary embodiments of this invention, are depicted in further detail below.

It should be noted that the period for requesting MBMS DOWNLINK ACK/NACKs from the MS 20 is a function of the network 10 implementation and, therefore, it should be possible for the MS 20 to use the exemplary embodiments described above also when the feedback mode is used by the MS 20, to avoid any problem that may be caused by a long polling period. In addition, the ACK/NACK message name, and the message content, may vary.

The advantages made possible by the use of the exemplary embodiments of this invention can include, but need not be limited to, a reduction in MS 20 battery consumption, additional freedom of use of MBMS services for the user, and improved control of radio resources on the network 10 side.

What follows are non-limiting examples of how the foregoing MS-20 originated stopping of a MBMS radio bearer may be implemented. Reference may be had to the above-referenced 3GPP TS 44.060 document, sub-clause 11.2.26 "Packet TBF Release", and compare same to the following modifications thereto (note the text in bold font) in accordance with the examples of this invention. The sub-clause references below are to sub-clauses in the 3GPP TS 44.060 document.

Packet TBF Release

This message is sent on the PACCH by the network 10 to the MS 20 to initiate release of an uplink or downlink TBF.

Message type: PACKET TBF RELEASE

Direction: network to mobile station

Classification: non-distribution message

PACKET TBF RELEASE Information Elements

---

< Packet TBF Release message content > ::=
     < PAGE_MODE : bit (2) >
     {     0 < GLOBAL_TFI : Global TFI IE >
         {     < UPLINK_RELEASE : bit (1) >
             < DOWNLINK_RELEASE : bit (1) >
             < TBF_RELEASE_CAUSE : bit (4) = { 0000 | 0010
             | 0100 < TLLI : bit (32) > } >
             < padding bits >
             ! < Non-distribution part error : bit (*) = < no string > > }
         ! < Address information part error : bit (*) = < no string > > }
     ! < Distribution part error : bit (*) = < no string > > ;

---

PACKET TBF RELEASE Information Element Details

PAGE_MODE (2 bit field)

This field is defined in sub-clause 12.20.

Global TFI IE

This information element contains the TFI of the mobile station's which uplink and/or downlink TBF to be released. This field is defined in sub-clause 12.10.

Uplink_Release (1 bit field)

Downlink_Release (1 bit field)

These fields indicate which TBF shall be release, uplink or downlink. Both directions can be released at the same time.

0 TBF shall not be released

1 TBF shall be released

TBF_RELEASE_CAUSE (4 bit field)

This field indicates the reason for the release of the TBF. This field is encoded according to the following table:

--- bit
4 3 2 1
0 0 0 0 Normal release
0 0 1 0 Abnormal release
0 1 0 0 Stop receiving MBMS radio bearer

---

All other values are reserved, the same behavior in reception as if 'Abnormal release'.

TLLI

This information element is defined in sub-clause 12.16.

The TBF_RELEASE_CAUSE field value of 0 1 0 0 for indicating the "Stop receiving MBMS radio bearer" is newly added in accordance with the examples of this invention, as is the TLLI for uniquely identifying the MS 20 to which the PACKET TBF RELEASE message is intended, and function as discussed above.

It can be appreciated that the examples of this invention provide in one aspect thereof a method, apparatus and a computer program for enabling the MS 20 to originate a request to the network 10 to stop receiving a MBMS radio bearer, whether in the non-feedback mode or in the feedback mode.

It can be further appreciated that the examples of this invention provide in another aspect thereof a method, apparatus and a computer program for enabling the network 10 to respond to a MS-originated request to stop receiving a MBMS radio bearer, whether in the non-feedback mode or in the feedback mode, and to release the MS 20 from receiving the MBMS radio bearer The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. For example, and as was noted above, other message types and/or information elements may be used and/or defined for implementing the exemplary embodiments of this invention. However, all such and similar modifications will still fall within the scope of the exemplary embodiments of this invention.

Furthermore, some of the features of the exemplary embodiments of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:

originating a request at one mobile station of a plurality of mobile stations to terminate reception of at least one session of a multimedia broadcast/multimedia service radio bearer received by said plurality of mobile stations;

transmitting the request to a base station subsystem that is the source of the multimedia broadcast/multimedia service radio bearer; and receiving from the base station subsystem, via a packet associated control channel, a release message that comprises identification of the one mobile station of the plurality of mobile stations and a value defined to indicate to the one mobile station to stop receiving the at least one session of the multimedia broadcast/multimedia service radio bearer without release of the entire multimedia broadcast/multimedia service radio bearer from the plurality of mobile stations receiving the multimedia broadcast/multimedia service radio bearer.

2. The method of claim 1, where the one of the plurality of mobile stations is operating in a non-feedback mode of operation.

3. The method of claim 1, where the one of the plurality of mobile stations is operating in a feedback mode of operation.

4. The method of claim 2, where originating and transmitting comprise sending the base station subsystem a packet associated control channel request message with an access cause "Single Block MBMS Access", and the method further comprising, between transmitting the request and receiving from the base station subsystem the release message,
receiving from the base station subsystem an allocation of an uplink radio block;
sending in the allocated uplink radio block a multimedia broadcast/multimedia service request message to the base station subsystem, the multimedia broadcast/multimedia service request comprising the identification of the one of the plurality of mobile stations and a stop receiving the at least one session of the multimedia broadcast/multimedia service radio bearer parameter,
the value defined as stop receiving multimedia broadcast/multimedia service radio bearer comprises a TBF_RELEASE_CAUSE value.

5. The method of claim 3, where originating and transmitting comprise sending the base station subsystem the identification of the mobile station and a stop receiving the at least one session of the multimedia broadcast/multimedia service radio bearer parameter in a multimedia broadcast/multimedia service downlink ACK/NACK message.

6. An apparatus, comprising:
a memory configured to store a program; and
a processor configured to execute the program retrieved from the memory and, in response to execution of the program, configured to originate a request to terminate reception of at least one session of a multimedia broadcast/multimedia service radio bearer and to transmit the request to a base station subsystem that is the source of the at least one session of the multimedia broadcast/multimedia service radio bearer;
wherein the apparatus is configured to receive from the base station subsystem, via a packet associated control channel, a release message that comprises an identification of the apparatus and a value defined as stop receiving the at least one session of the multimedia broadcast/multimedia service radio bearer by the apparatus, without release of the entire multimedia broadcast/multimedia service radio bearer.

7. The apparatus of claim 6, where the apparatus is configured to operate in a non-feedback multimedia broadcast/multimedia service mode of operation.

8. The apparatus of claim 6, where the apparatus is configured to operate in a feedback multimedia broadcast/multimedia service mode of operation.

9. The apparatus of claim 7, where the data processor, when operating to originate and transmit the request, is configured to send the base station subsystem a request message with an access cause "Single Block MBMS Access", and is further configured to receive from the base station subsystem an allocation of an uplink radio block; to send in the allocated uplink radio block a multimedia broadcast/multimedia service request message to the base station subsystem, the multimedia broadcast/multimedia service request comprising the_dentification of the apparatus and a stop receiving multimedia broadcast/multimedia service radio bearer parameter; and to receive from the base station subsystem the release message comprising the identification of the apparatus and the value defined as stop receiving multimedia broadcast/multimedia service radio bearer, the value defined as stop receiving multimedia broadcast/multimedia service radio bearer comprises a TBF_RELEASE_CAUSE value.

10. The apparatus of claim 8, where the data processor, when operating to originate and transmit the request, is configured to send the base station subsystem the identification of the apparatus and a stop receiving multimedia broadcast/multimedia service radio bearer parameter in a multimedia broadcast/multimedia service downlink ACK/NACK message, and is further configured to receive from the base station subsystem the release message comprising the identification of the apparatus and the value defined as stop receiving multimedia broadcast/multimedia service radio bearer, the value defined as stop receiving multimedia broadcast/multimedia service radio bearer comprises a TBF_RELEASE_CAUSE value.

11. A method, comprising:
receiving a request from a mobile station to terminate reception of a multimedia broadcast/multimedia service radio bearer; and
in response, determining at a base station subsystem to send, via a packet associated control channel, the mobile station a release message comprising an identification of the mobile station and a value defined as stop receiving multimedia broadcast/multimedia service radio bearer without release of the entire multimedia broadcast/multimedia service radio bearer by other mobile stations in a group of mobile stations including said requesting mobile station receiving said multimedia broadcast/multimedia service radio bearer.

12. The method of claim 11, where for a case where the mobile station is operating in a non-feedback mode of operation the request is received as a associated control channel request message with an access cause "Single Block MBMS Access", and further comprising:
allocating an uplink radio block to the mobile station; and
receiving in the allocated uplink radio block a multimedia broadcast/multimedia service request message that comprises the identification of the mobile station and a stop receiving multimedia broadcast/multimedia service radio bearer parameter;
where the sending of the release message occurs in response to the receipt of the multimedia broadcast/multimedia service request message, wherein the value defined as stop receiving multimedia broadcast/multimedia service radio bearer comprises a TBF_RELEASE_CAUSE value.

13. The method of claim 11, where for a case where the mobile station is operating in a feedback mode of operation the request is received in a multimedia broadcast/multimedia service downlink ACK/NACK message that comprises a stop receiving multimedia broadcast/multimedia service radio bearer parameter, and where the sending of the release message occurs in response to the receipt of the multimedia broadcast/multimedia service downlink ACK/NAK message, wherein the value defined as stop receiving multimedia broadcast/multimedia service radio bearer comprises a TBF_RELEASE_CAUSE value.

14. A base station subsystem, comprising:
a memory configured to store for storing a program; and
a data processor configured to execute the program retrieved from the memory and, in response to execution of the program, to receive a request from a mobile station to terminate reception of a multimedia broadcast/multimedia service radio bearer; and in response, to determine to send the mobile station, via a packet associated control channel, a release message that comprises an identification of the mobile station and a value defined as stop receiving multimedia broadcast/multimedia service radio bearer without release of the entire multimedia broadcast/multimedia service radio bearer by other mobile stations in a group of mobile stations including said requesting mobile station receiving said multimedia broadcast/multimedia service radio bearer.

15. The base station subsystem of claim 14, where for a case where the mobile station is operating in a non-feedback mode of operation the request is received as a packet associated control channel request message with an access cause "Single Block MBMS Access", and the data processor is further configured to allocate an uplink radio block to the mobile station and to receive in the allocated uplink radio block a multimedia broadcast/multimedia service request message that comprises the identification of the mobile station and a stop receiving multimedia broadcast/multimedia service radio bearer parameter; where the sending of the release message occurs in response to the receipt of the multimedia broadcast/multimedia service request message, wherein the value defined as stop receiving multimedia broadcast/multimedia service radio bearer comprises a TBF_RELEASE_CAUSE value.

16. The base station subsystem of claim 14, where for a case where the mobile station is operating in a feedback mode of operation the request is received in a multimedia broadcast/multimedia service downlink ACK/NACK message that comprises a stop receiving multimedia broadcast/multimedia service radio bearer parameter, and where the data processor is configured to send the release message in response to the receipt of the multimedia broadcast/multimedia service downlink ACK/NAK message, wherein the value defined as stop receiving multimedia broadcast/multimedia service radio bearer comprises a TBF_RELEASE_CAUSE value.

17. The method of claim 1, wherein the release message releases a temporary block flow of the one of the plurality of mobile stations and not the entire multimedia broadcast/multimedia service radio bearer.

18. The apparatus of claim 6, wherein the release message releases a temporary block flow of the apparatus and not the entire multimedia broadcast/multimedia service radio bearer.

19. The method of claim 11, wherein the release message is adapted to cause release of a temporary block flow of the apparatus and not the entire multimedia broadcast/multimedia service radio bearer.

20. The base station subsystem of claim 14, wherein the release message is adapted to cause release of a temporary block flow of the apparatus and not the entire multimedia broadcast/multimedia service radio bearer.

21. A method, comprising:
originating a request at a mobile station to terminate reception of at least one session of a multimedia broadcast/multimedia service bearer;
transmitting the request to a network that is the source of the multimedia broadcast/multimedia service radio bearer; and
receiving from the network, via a packet associated control channel, a release message that comprises identification of the mobile station and a value defined as stop receiving the at least one session of the multimedia broadcast/multimedia service radio bearer without release of the entire multimedia broadcast/multimedia service radio bearer.

22. The method according to claim 21, wherein the at least one session is one of a plurality of sessions received by the mobile station of the multimedia broadcast/multimedia service bearer.

23. An apparatus, comprising:
a memory configured to store a program;
a processor configured to execute the program retrieved from the memory and, in response to execution of the program, configured to originate a request to terminate reception of at least one session of a multimedia broadcast/multimedia service radio bearer; and
a transmitter configured to transmit the request to a network that is the source of the at least one session of the multimedia broadcast/multimedia service radio bearer, and
a receiver configured to receive from the network, via a packet associated control channel, a release message that comprises identification of the mobile station and a value defined as stop receiving the at least one session of the multimedia broadcast/multimedia service radio bearer without release of the entire multimedia broadcast/multimedia service radio bearer.

24. The apparatus according to claim 23, wherein the at least one session is one of a plurality of sessions received by the mobile station of the multimedia broadcast/multimedia service bearer.

\* \* \* \* \*